United States Patent
Kohara

(10) Patent No.: US 10,620,686 B2
(45) Date of Patent: *Apr. 14, 2020

(54) SEMICONDUCTOR INTEGRATED CIRCUIT

(71) Applicant: Kabushiki Kaisha Toshiba, Minato-ku, Tokyo (JP)

(72) Inventor: Yoshihisa Kohara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 15/886,905

(22) Filed: Feb. 2, 2018

(65) Prior Publication Data

US 2018/0157306 A1 Jun. 7, 2018

Related U.S. Application Data

(63) Continuation of application No. 14/947,991, filed on Nov. 20, 2015, now Pat. No. 9,891,689.

(30) Foreign Application Priority Data

Dec. 22, 2014 (JP) ................. 2014-259426

(51) Int. Cl.
*G06F 1/3237* (2019.01)
*G06F 1/324* (2019.01)
(Continued)

(52) U.S. Cl.
CPC ............ *G06F 1/3237* (2013.01); *G06F 1/324* (2013.01); *G06F 1/3206* (2013.01);
(Continued)

(58) Field of Classification Search
CPC ...... G06F 1/3206; G06F 1/3237; G06F 1/324; G06F 1/3243; G06F 1/3275;
(Continued)

(56) References Cited

U.S. PATENT DOCUMENTS 7,088,164 B2 8/2006 Mano
7,245,148 B2 7/2007 Awalt et al.
(Continued)

FOREIGN PATENT DOCUMENTS

JP 2002-288150 A 10/2002
JP 2007-86983 A 4/2007
(Continued)

OTHER PUBLICATIONS

Kanak Agarwal et al., "Power Gating with Multiple Sleep Modes," IEEE Conference, 7th International Symposium on Quality Electronic Design (ISQED '06), Mar. 27-29, 2006, pp. 633-637.
(Continued)

*Primary Examiner* — Terrell S Johnson

(74) *Attorney, Agent, or Firm* — White & Case LLP

(57) ABSTRACT

According to one embodiment, a semiconductor integrated circuit includes the following configuration. A arithmetic processing circuit includes a first processor core performing arithmetic processing and a common unit containing a cache memory storing data and programs, and the first processor core or the common unit is divided into a first circuit and a second circuit. The first clock gating circuit supplies or stops a clock to the first circuit. The first power switch supplies or cuts off a power supply voltage to the first circuit. The second clock gating circuit supplies or stops the clock to the second circuit. The second power switch supplies or cuts off the power supply voltage to the second circuit. The controller controls the clock gating circuits and the power switches.

15 Claims, 15 Drawing Sheets

(51) Int. Cl.
  *G06F 1/3287*  (2019.01)
  *G06F 1/3206*  (2019.01)
  *G06F 1/3234*  (2019.01)
  *H04N 13/275*  (2018.01)

(52) U.S. Cl.
  CPC .......... *G06F 1/3243* (2013.01); *G06F 1/3275* (2013.01); *G06F 1/3287* (2013.01); *H04N 13/275* (2018.05); *Y02B 70/12* (2013.01); *Y02B 70/123* (2013.01); *Y02B 70/126* (2013.01); *Y02B 70/32* (2013.01); *Y02D 10/128* (2018.01); *Y02D 10/14* (2018.01); *Y02D 10/152* (2018.01); *Y02D 10/171* (2018.01); *Y02D 50/20* (2018.01)

(58) Field of Classification Search
  CPC ..... G06F 1/3287; Y02B 70/12; Y02B 70/123; Y02B 70/126; Y02B 70/32; Y02D 10/14; Y02D 10/152; Y02D 10/171; Y02D 50/20
  See application file for complete search history.

(56) References Cited

U.S. PATENT DOCUMENTS

| | | | |
|---|---|---|---|
| 7,398,409 | B2 | 7/2008 | Okada |
| 2008/0007319 | A1 | 1/2008 | Cox |
| 2008/0013394 | A1 | 1/2008 | Wu |
| 2008/0307244 | A1* | 12/2008 | Bertelsen .............. G06F 1/3203 713/323 |
| 2010/0142231 | A1 | 6/2010 | Chuang et al. |
| 2011/0296220 | A1 | 12/2011 | Arai |
| 2012/0102344 | A1* | 4/2012 | Kocev ................... G06F 1/3237 713/322 |
| 2012/0224397 | A1 | 9/2012 | Yeh |
| 2014/0095896 | A1* | 4/2014 | Carter ....................... G06F 1/26 713/300 |
| 2014/0181556 | A1* | 6/2014 | Eckert .................... G06F 1/324 713/323 |

FOREIGN PATENT DOCUMENTS

| | | |
|---|---|---|
| JP | 2008-300922 A | 12/2008 |
| JP | 5109935 B2 | 10/2012 |
| TW | I314324 B | 9/2009 |
| TW | 201023490 A | 6/2010 |
| TW | I346847 B | 8/2011 |
| TW | 201238223 A | 9/2012 |

OTHER PUBLICATIONS

Zhigang Hu et al., "Microarchitectural Techniques for Power Gating of Execution Units," ISLPED '04 Proceedings of the 2004 International Symposium on Low Power Electronics and Design, Aug. 9-11, 2004, pp. 32-37.

Extended European Search Report dated Feb. 4, 2016 in counterpart European patent application No. 15194694.4.

David Flynn, "Power Gating Applied to MP-SoCs for Standby-Mode Power Management," Research & Development, ARM Ltd., pp. 1-5 (May 29, 2013).

Taiwanese Office Action dated Oct. 26, 2016 in counterpart patent Application No. 104140971, along with English translation thereof.

\* cited by examiner

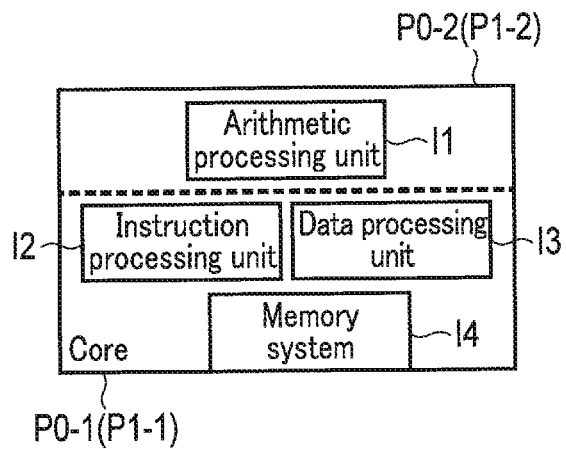
F I G. 6A
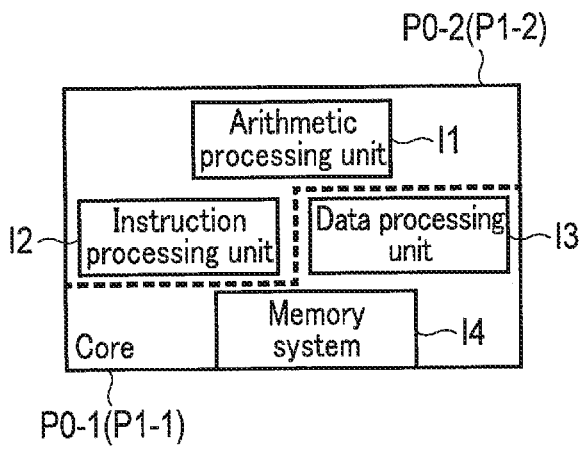
F I G. 6B
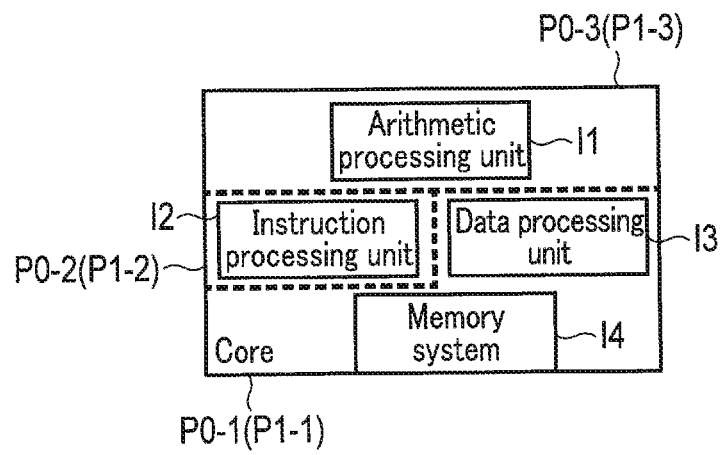
F I G. 6C

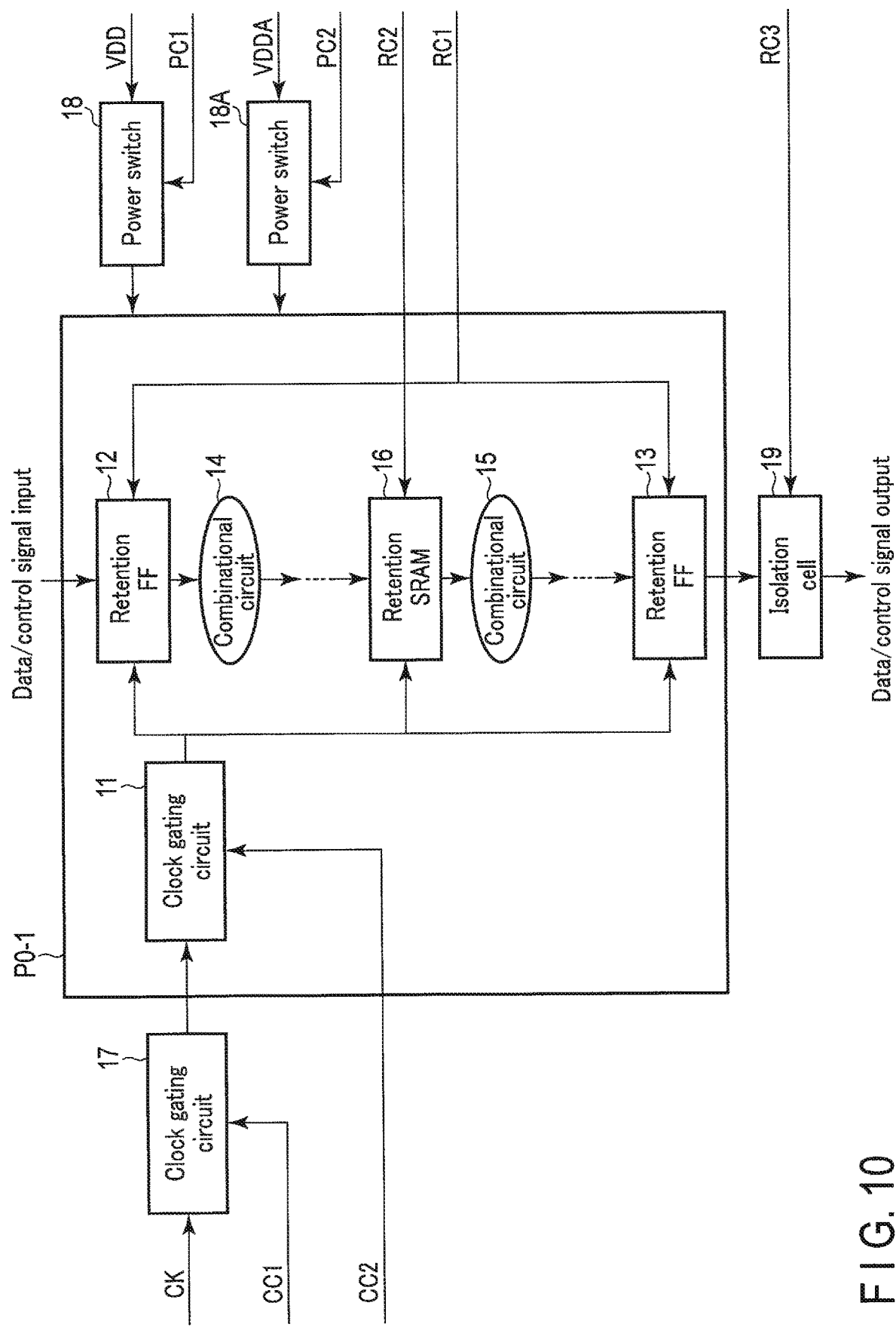
F I G. 10

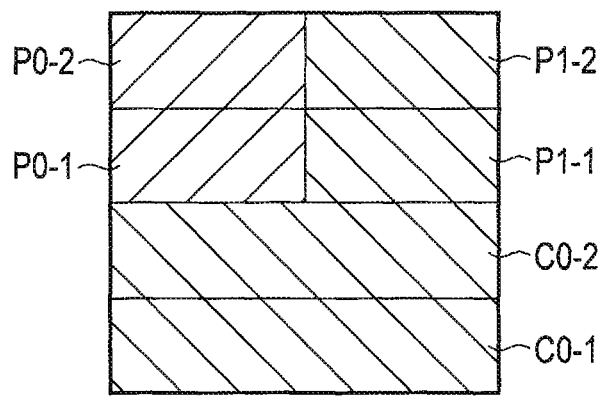
F I G. 20
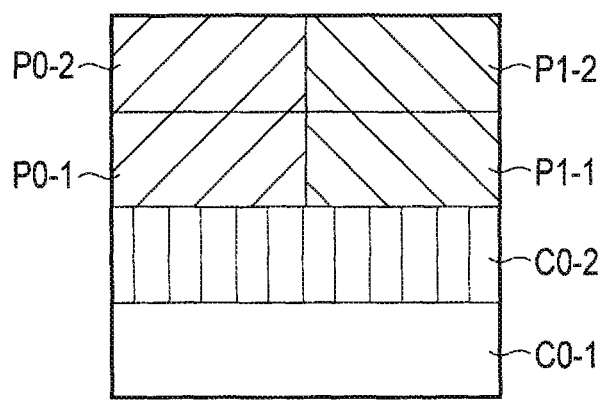
F I G. 21

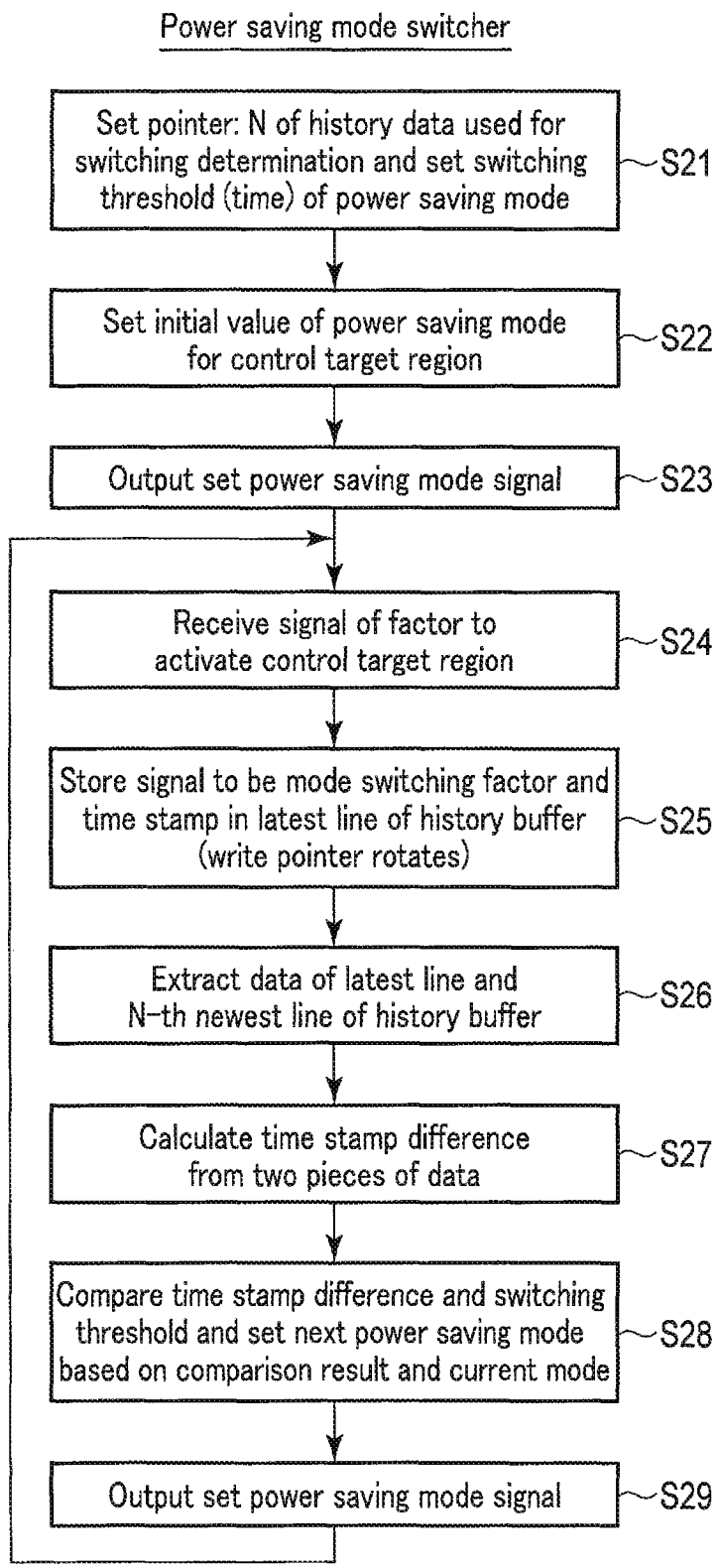
F I G. 24

SEMICONDUCTOR INTEGRATED CIRCUIT

CROSS-REFERENCE TO RELATED APPLICATIONS

This application is a continuation of application Ser. No. 14/947,991, filed Nov. 20, 2015 and is based upon and claims the benefit of priority from the Japanese Patent Application No. 2014-259426, filed Dec. 22, 2014, the entire contents of which are incorporated herein by reference.

FIELD

Embodiments described herein relate generally to a semiconductor integrated circuit capable of low power consumption control.

BACKGROUND

Typical techniques of low power consumption (power saving) control technology of a semiconductor integrated circuit (LSI) include defining an operating state and a standby state for a circuit to be controlled to reduce power consumption in the standby state in which the circuit performs no processing.

A concrete implementation method for reducing power consumption in the standby state includes the reduction of a dynamic current by clock gating and the reduction of a leak current by power supply shutdown. The clock gating only slightly affects system performance due to a return to normal operation at high speed, but the effect thereof to reduce power consumption is inferior to the power supply shutdown. The reverse thereof applies to the power supply shutdown and while the effect of reducing power consumption is large, it takes time to return to normal operation and thus, the software control and system performance are significantly affected.

To combine lower power consumption and improved system performance, each application needs tuning of control and throughput, leading to increased development costs. For example, the work to determine whether or not to incorporate power saving control in accordance with the length of the standby time in an application and to implement software by minutely investigating whether to adopt only clock gating or both of clock gating and power supply shutdown as a means of power saving is needed.

BRIEF DESCRIPTION OF THE DRAWING

FIGS. 6A, 6B, and 6C are diagrams showing configuration examples of a sub-core according to the embodiment;

FIG. 10 is a diagram showing a function block contained by the sub-core according to the embodiment;

FIG. 20 is a diagram showing the control method of a power saving control pattern 3 according to the embodiment;

FIG. 21 is a diagram showing the control method of a power saving control pattern 4 according to the embodiment;

FIG. 24 is a flow chart showing the operation of the power saving mode switcher according to the embodiment.

DETAILED DESCRIPTION

Figure 1:
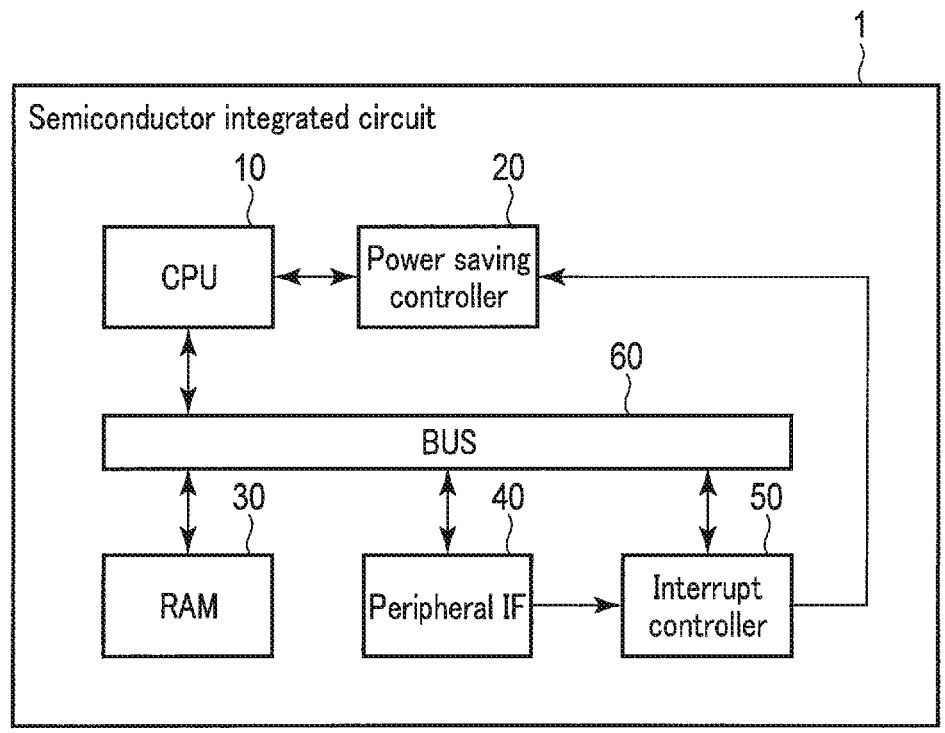
FIG. 1 is a block diagram showing the configuration of a semiconductor integrated circuit according to an embodiment.

Hereinafter, an embodiment will be described with reference to the drawings. In the description that follows, the same reference numerals are attached to components having the same function and configuration and a duplicate description is provided only when necessary.

In general, according to one embodiment, a semiconductor integrated circuit includes an arithmetic processing circuit, a first clock gating circuit, a first power switch, a second clock gating circuit, a second power switch and controller. The arithmetic processing circuit includes a first processor core performing arithmetic processing and a common unit containing a cache memory storing data and programs, and at least one of the first processor core and the common unit is divided into a first circuit and a second circuit. The first clock gating circuit supplies or stops a clock signal to the first circuit. The first power switch supplies or cuts off a power supply voltage to the first circuit. The second clock gating circuit supplies or stops the clock signal to the second circuit. The second power switch supplies or cuts off the power supply voltage to the second circuit. The controller controls the first and second clock gating circuits and the first and second power switches.

Embodiment

A semiconductor integrated circuit capable of low power consumption control according to the present embodiment will be described.

1. Configuration of Semiconductor Integrated Circuit

FIG. 1 is a block diagram showing the configuration of a semiconductor integrated circuit according to an embodiment. A semiconductor integrated circuit 1 includes a CPU (central processing unit) 10, a power saving controller 20, a RAM (random access memory) 30, a peripheral interface (peripheral IF) 40, and an interrupt controller 50. A bus 60 connects the CPU 10, the power saving controller 20, the RAM 30, the peripheral interface (peripheral IF) 40, and the interrupt controller 50. The target of power saving control is the CPU 10 and the power saving controller 20 executes power saving control of a control target region in the CPU 10. Here, the CPU 10 is taken as an example, but the power saving control can also be applied to a three-dimensional graphic processor, a video graphic processor and the like.

The CPU 10 is a device having a function to perform processing such as computing operation on data and includes a plurality of circuits. A detailed configuration of the CPU 10 will be described later.

The power saving controller 20 executes power saving control that sets the control target region (power supply domain) in the CPU 10 to a power saving state. The power saving controller 20 outputs clock control signals CC1, CC2 and control signals PC1, PC2, RC1, RC2, RC3 to the CPU 10 to execute power saving control. The RAM 30 stores programs executed by the CPU 10, firmware to control the control target region in the CPU 10 and the like. Further, the RAM 30 is used as a word area of the CPU 10.

The peripheral interface 40 outputs an interrupt request to the interrupt controller 50 in accordance with various events input from outside. The interrupt controller 50 outputs an interrupt request to the power saving controller 20 as a wakeup factor signal. Also, the CPU 10 outputs a wakeup factor signal or a sleep factor signal to the power saving controller 20. The wakeup factor signal is a signal to be a factor to restart an operation when the operation of the control target region in the CPU 10 is stopped. The sleep factor signal SP is a signal indicating that the control target region in the CPU 10 can enter a standby state by stopping the operation thereof.

Hereinafter, the configuration of the CPU 10 in the present embodiment will be described in detail.

Figure 2:
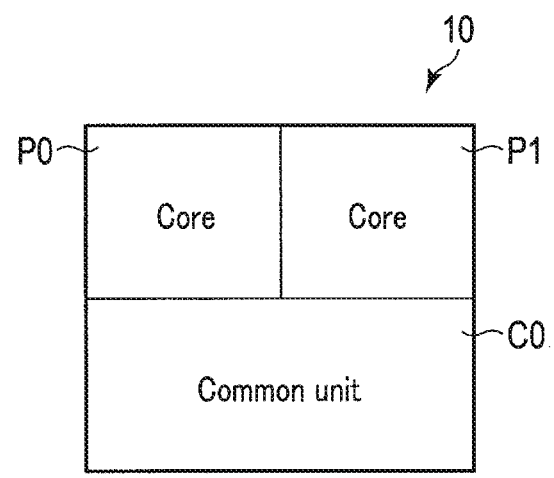
FIG. 2 is a diagram showing a detailed configuration of a CPU according to the embodiment.
Figure 3:
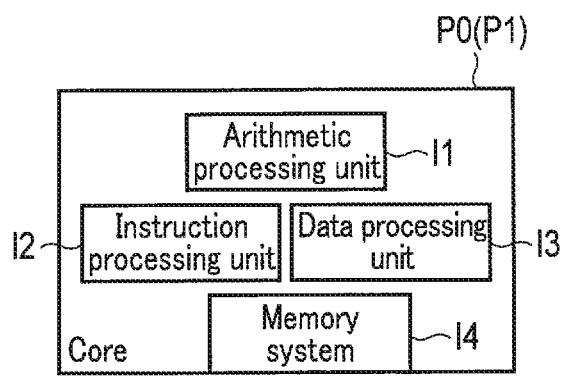
FIG. 3 is a diagram showing the configuration of a core of the CPU according to the embodiment.
Figure 4:
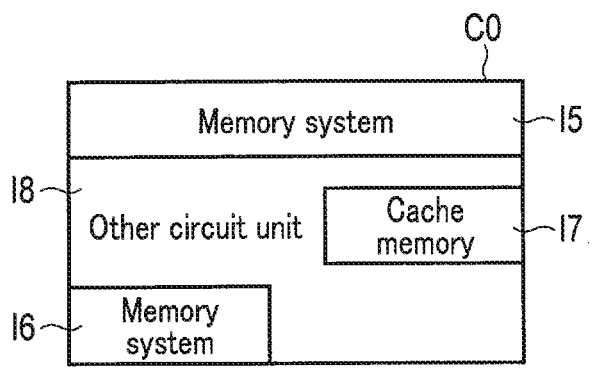
FIG. 4 is a diagram showing the configuration of a common unit of the CPU according to the embodiment.

FIG. 2 is a diagram showing a detailed configuration of the CPU 10. The CPU 10 includes a processor core P0, a processor core P1, and a common unit CO. Each of the processor cores (hereinafter, denoted as cores) P0, P1 is a circuit unit operating as an independent arithmetic processing circuit. FIG. 3 shows the configuration of the core P0 or the core P1. The core P0 includes an arithmetic processing unit I1, an instruction processing unit I2, a data processing unit I3, and a memory system I4 as function units. Similarly, the core P1 includes the arithmetic processing unit I1, the instruction processing unit I2, the data processing unit I3, and the memory system I4 as function units. The common unit CO is a unit used by the cores P0, P1 in common. FIG. 4 shows the configuration of the common unit CO. The common unit CO includes memory systems (memory controllers that control a cache memory) I5, I6, a cache memory I7, and another circuit unit I8 as function units. The cache memory I7 stores data sent to or received from outside the CPU 10 and programs. The memory systems I5, I6 include the memory controller that controls the cache memory I7.

Next, power saving controllable units of the CPU 10 according to the present embodiment will be described.

Figure 5:
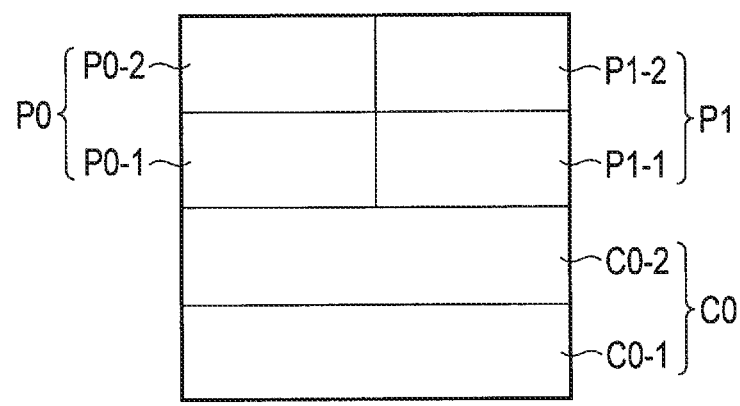
FIG. 5 is a diagram showing power saving control units of the CPU according to the embodiment.

FIG. 5 is a diagram showing power saving controllable units of the CPU 10 according to the embodiment. For example, the core P0 is divided by a power saving control unit into two portions, denoted as sub-cores P0-1, P0-2. Also, the core P1 is divided by a power saving control unit into two portions, denoted as sub-cores P1-1, P1-2.

Each of the sub-cores P0-1, P0-2, P1-1, P1-2 has one function unit or a plurality of function units. FIGS. 6A and 6B show configuration examples of the sub-cores P0-1, P0-2. The sub-core P0-1 includes, as shown, for example, in FIG. 6A, the instruction processing unit I2, the data processing unit I3, and the memory system I4 and the sub-core P0-2 includes the arithmetic processing unit I1. Similarly, the sub-cores P1-1, P1-2 include the configuration shown in FIG. 6A.

Also, the sub-core P0-1 includes, as shown in FIG. 6B, the data processing unit I3 and the memory system I4 and the sub-core P0-2 includes the arithmetic processing unit I1 and the instruction processing unit I2. Similarly, the sub-cores P1-1, P1-2 include the configuration shown in FIG. 6B.

Here, an example of dividing each of the cores P0, P1 into two portions is shown, but the present embodiment is not limited to such an example and each of the cores P0, P1 may be divided into three portions or more. FIG. 6C shows an example of dividing the core P0 into sub-cores P0-1, P0-2, P0-3. The sub-core P0-1 includes the data processing unit I3 and the memory system I4, the sub-core P0-2 includes the instruction processing unit I2, and the sub-core P0-3 includes the arithmetic processing unit I1. Similarly, sub-cores P1-1, P1-2, P1-3 include the configuration shown in FIG. 6C.

Figure 7A:
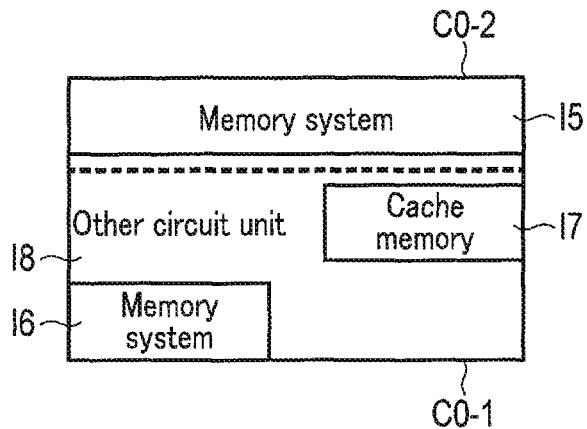
FIGS. 7A, 7B, and 7C are diagrams showing configuration examples of a sub-common unit according to the embodiment.
Figure 7B:
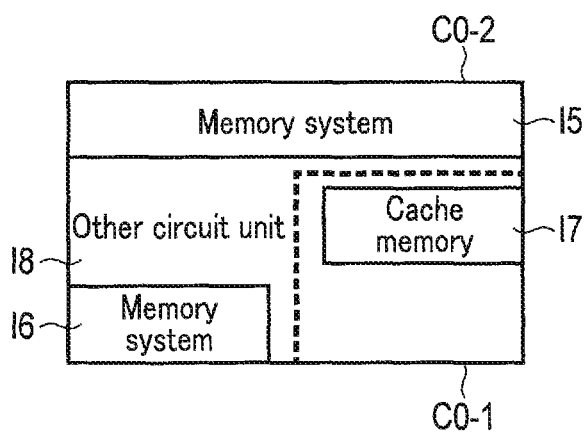
Figure 7C:
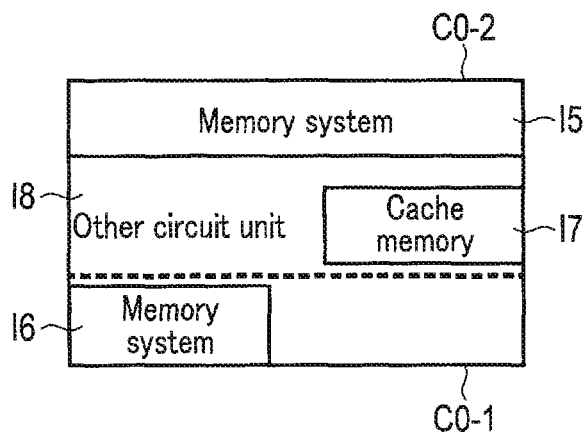

As shown in FIG. 5, the common unit CO is divided by a power saving control unit into two portions, denoted as sub-common units CO-1, CO-2. Each of the sub-common units CO-1, CO-2 has one function unit or a plurality of function units. FIGS. 7A, 7B, and 7C show configuration examples of the sub-common units CO-1, CO-2. The sub-common unit CO-1 includes, as shown, for example, in FIG. 7A, the memory system I6, the cache memory I7, and the other circuit unit I8, and the sub-common unit CO-2 includes the memory system I5.

Also, as shown in FIG. 7B, the sub-common unit CO-1 includes the cache memory I7 and the sub-common unit CO-2 includes the memory systems I5, I6 and the other circuit unit I8. Also, as shown in FIG. 7C, the sub-common unit CO-1 includes the memory system I6 and the sub-common unit CO-2 includes the memory system I5, the cache memory I7, and the other circuit unit I8. Here, an example of dividing the common unit CO into two portions is shown, but the present embodiment is not limited to such an example and the common unit CO may be divided into three portions or more.

The cores P0, P1 and the common unit CO may each be divided, regardless of the function unit, by a predetermined area or shape, power saving processing time, or circuit capacity as the power saving control unit. The predetermined area means, for example, dividing the region occupied by each of the cores P0, P1 and the common unit CO on the semiconductor substrate by a constant area. The power saving processing time means, for example, dividing the region occupied by each of the cores P0, P1 and the common unit CO on the semiconductor substrate by region for which the time needed for power saving control is constant.

Each of the cores P0, P1 may be set as the power saving control unit. Also, the common unit CO may be set as the power saving control unit.

Figure 8A:
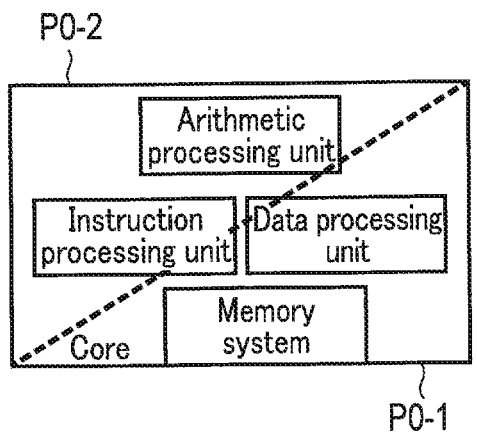
FIGS. 8A and 8B are diagrams showing configuration examples of the sub-core according to the embodiment.
Figure 8B:
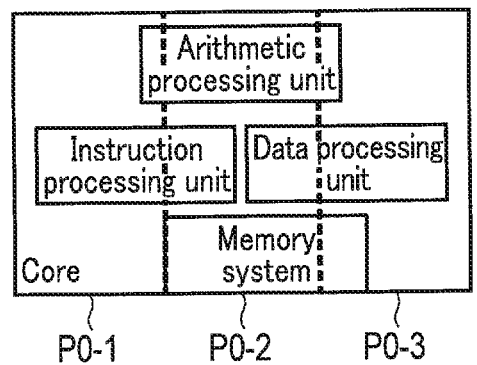

FIGS. 8A and 8B show examples of dividing the core P0 by a predetermined area. For example, as shown in FIG. 8A, the region occupied by the core P0 is diagonally divided and one divided region is denoted as a sub-core P0-1 and the other is denoted as a sub-core P0-2. Also, as shown in FIG. 8B, the region occupied by the core P0 may be divided into a plurality (here, three) of portions, denoted as sub-cores P0-1, P0-2, P0-3 from the left side.

Figure 9A:
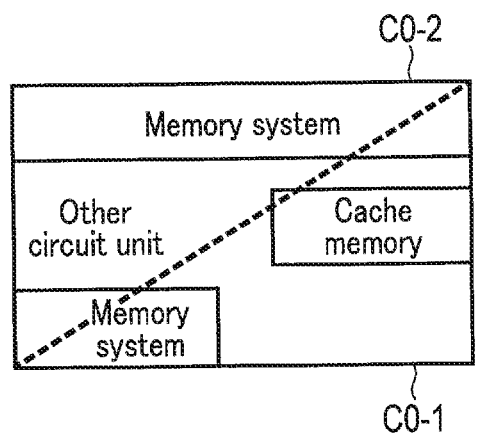
FIGS. 9A and 9B are diagrams showing configuration examples of the sub-common unit according to the embodiment.
Figure 9B:
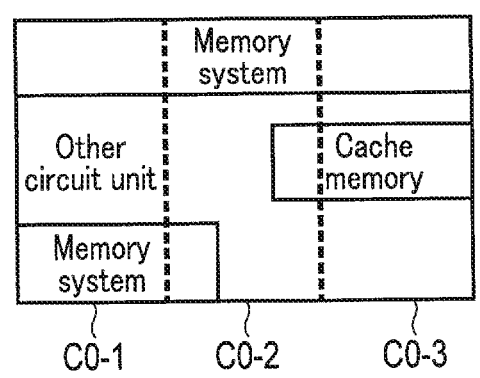

FIGS. 9A and 9B show examples of dividing the common unit CO by a predetermined area. For example, as shown in FIG. 9A, the region occupied by the common unit CO is diagonally divided and one divided region is denoted as a sub-common unit CO-1 and the other is denoted as a sub-common unit CO-2. Also, as shown in FIG. 9B, the region occupied by the common unit CO may be divided into a plurality (here, three) of portions, denoted as sub-common units CO-1, CO-2, CO-3 from the left side.

Next, the configuration of each of the sub-cores P0-1, P0-2, P1-1, P1-2 and the sub-common units CO-1, CO-2 will be described. Each of the sub-cores P0-1, P0-2, P1-1, P1-2 and the sub-common units CO-1, CO-2 has the configuration as shown in FIG. 10. The sub-core P0-1 is taken as an example and the configuration thereof is shown below.

FIG. 10 is a diagram showing a function block contained by the sub-core P0-1.

The sub-core P0-1 includes a clock gating circuit 11, retention FF (flip-flop) 12, 13, combinational circuits 14, 15, and a retention SRAM (static random access memory) 16. Further, a clock gating circuit 17, a power switch 18, a power switch 18A, and an isolation cell 19 are included outside the sub-core P0-1.

The clock gating circuit 17 supplies a clock CK to the sub-core P0-1 or stops the supply in accordance with the clock control signal CC1. The clock gating circuit 11 supplies the clock CK to the retention FF 12, 13 and the retention SRAM 16 or stops the supply in accordance with the clock control signal CC2. A power supply voltage VDD is supplied to the power switch 18. The power switch 18 supplies or cuts off the power supply voltage VDD to the sub-core P0-1 in accordance with a control signal PC1. A power supply voltage VDDA is supplied to the power switch 18A. The power switch 18A supplies or cuts off the power supply voltage VDDA to the sub-core P0-1 in accordance with the control signal PC2.

Data and a control signal are input into the retention FF 12. The retention FF 12 temporarily stores data and the control signal that have been input in accordance with the control signal RC1. The combinational circuits 14, 15 process input data and the like. The retention SRAM 16 stores data held in a buffer or the like when the supply of the power supply voltage to the sub-core P0-1 is stopped in accordance with the control signal RC2. The retention FF 13 temporarily stores data processed by the combinational circuit 15 or the like. When the supply of the power supply voltage to the sub-core P0-1 is stopped, the isolation cell 19 holds a value before the stop, that is, fixes an output signal of the sub-core P0-1 to one of the values of 0 and 1 in accordance with a control signal RC3. Accordingly, after the supply of the power supply voltage is stopped, the value of the output signal to the sub-core P0-2 or the sub-common units CO-1, CO-2 is defined. The isolation cell 19 is provided between the sub-core P0-1 and the sub-core P0-2. Also, the isolation cell 19 is provided between the sub-core P1-1 and the sub-core P1-2. Further, the isolation cell 19 is provided between the sub-common unit CO-1 and the sub-common unit CO-2.

When each of the cores P0, P1 and the common unit CO is set as the power saving control unit, each of the cores P0, P1 and the common unit CO includes the configuration as shown in FIG. 10.

Hereinafter, the configuration of the power saving controller 20 in the present embodiment will be described in detail.

Figure 11:
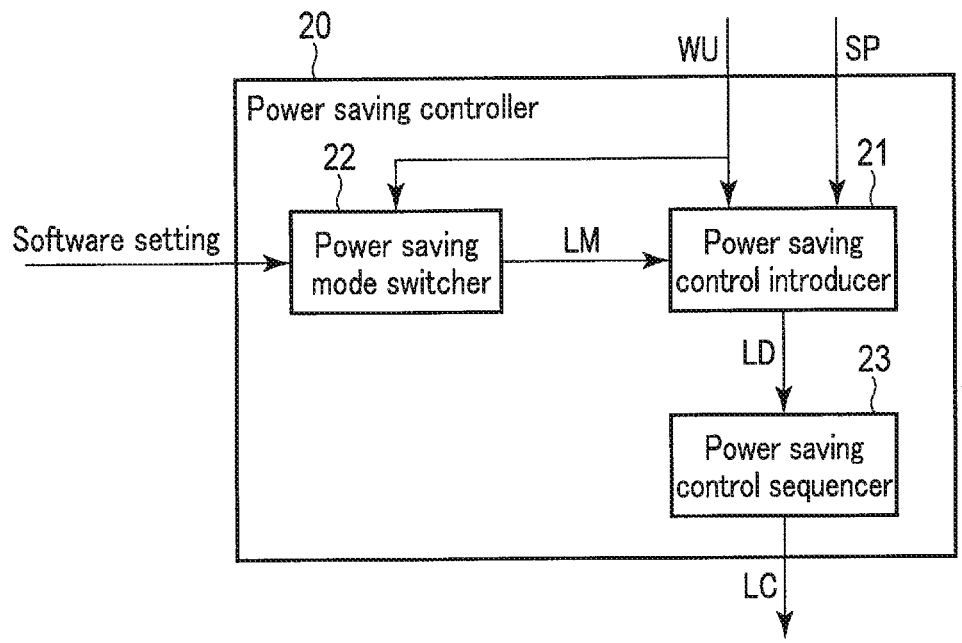
FIG. 11 is a block diagram showing the configuration of a power saving controller according to the embodiment.

FIG. 11 is a block diagram showing the configuration of the power saving controller 20 in the semiconductor integrated circuit 1 according to the embodiment. The power saving controller 20 includes a power saving control introducer 21, a power saving mode switcher 22, and a power saving control sequencer 23.

The power saving control introducer 21 is set to a predetermined power saving mode in accordance with a power saving mode signal LM by the power saving mode signal LM output from the power saving mode switcher 22. The power saving control introducer 21 receives a wakeup factor signal WU or a sleep factor signal SP from the interrupt controller 50 or the CPU 10 in the set power saving mode and instructs execution or release of the power saving control for a plurality of control target regions in the CPU 10 in accordance with these signals. The power saving control introducer 21 determines the type of the power saving state and the transition timing thereto and outputs a needed control request signal LD to the power saving control sequencer 23.

The power saving control sequencer 23 executes or releases the power saving control in accordance with the control request signal LD. That is, the power saving control sequencer 23 outputs a power saving control signal LC that controls the execution or release of clock gating and the supply or cutoff of the power supply voltage to the plurality of control target regions in the CPU 10. The configuration of the power saving control sequencer 23 will be described later.

The control target region in the CPU 10 can take a plurality of power states. If the plurality of power states include four states, for example, (1) an operating state, (2) a clock gating state in which the clock supply is stopped, (3) a retention state in which the supply of the power supply voltage is cut off, and (4) a total power supply OFF state in which no retention is performed at all, three states of (2), (3) and (4) are power saving states. The unit that determines which of (2), (3) and (4) to use and outputs the power saving mode signal LM instructing the setting of an appropriate power saving mode is the power saving mode switcher 22. When determined to use (3) the retention state, the power saving mode switcher 22 further determines which control target region to put into a retention state. The configuration of the power saving mode switcher 22 will be described later.

Hereinafter, the configuration of the power saving control introducer 21 according to the present embodiment will be described in detail.

Figure 12:
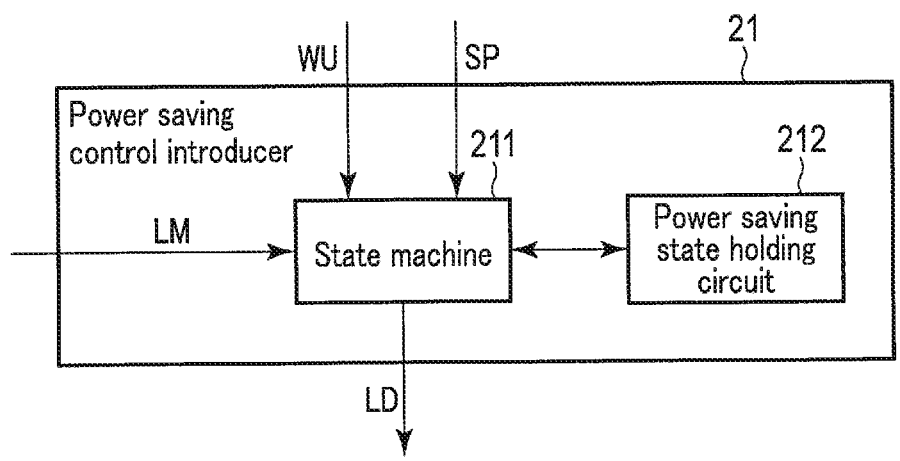
FIG. 12 is a block diagram showing the configuration of a power saving control introducer according to the embodiment.

FIG. 12 is a block diagram showing the configuration of the power saving control introducer 21 in the power saving controller 20 according to the embodiment. The power saving control introducer 21 includes a state machine 211 and a power saving state holding circuit 212.

The state machine 211 sends/receives a state signal ST to/from the power saving state holding circuit 212. The state signal ST is a signal indicating the current power state of the control target region in the CPU 10. The state machine 211 recognizes the power state of the control target region in the CPU 10 based on the state signal ST output from the power saving state holding circuit 212. Further, the state machine 211 sets the optimal power saving mode based on the power saving mode signal LM output from the power saving mode switcher 22.

When the wakeup factor signal WU or the sleep factor signal SP is received, the state machine 211 determines to which power state the control target region should be transitioned according to the set power saving mode. Then, the state machine 211 outputs the control request signal LD to cause the transition to that power state to the power saving control sequencer 23.

Hereinafter, the configuration of the power saving control sequencer 23 according to the present embodiment will be described in detail.

Figure 13:
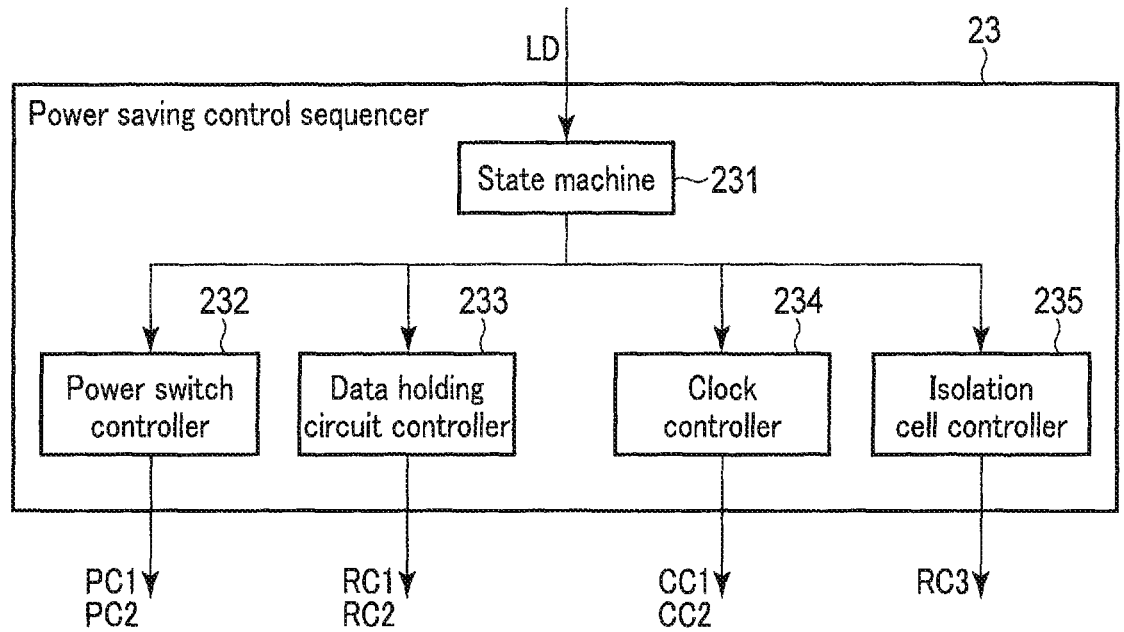
FIG. 13 is a block diagram showing the configuration of a power saving control sequencer according to the embodiment.

FIG. 13 is a block diagram showing the configuration of the power saving control sequencer 23 in the power saving controller 20 according to the embodiment. The power saving control sequencer 23 includes a state machine 231, a power switch controller 232, a data holding circuit controller 233, a clock controller 234, and an isolation cell controller 235.

The state machine 231 controls the power switch controller 232, the data holding circuit controller 233, the clock controller 234, and the isolation cell controller 235 based on the control request signal LD.

The power switch controller 232 outputs the control signal PC1 that controls the supply or cutoff of the power supply voltage VDD to the plurality of control target regions in the CPU 10 to the power switch 18. The power switch 18 controls the supply or cutoff of the power supply voltage VDD to the combinational circuit 15, portions other than the data holding unit inside the retention FF 12, 13, and portions other than the data holding unit inside the retention SRAM 16.

The power switch controller 232 also outputs a control signal PC2 that controls the supply or cutoff of the power supply voltage VDDA to the plurality of control target regions in the CPU 10 to the power switch 18A. Even when the supply of the power supply voltage VDD is cut off by the power switch 18, the power switch 18A controls the supply or cutoff of the power supply voltage VDDA to circuits whose power supply should be kept turned on. For example, the power switch 18A controls the supply or cutoff of the power supply voltage VDDA to the data holding unit inside the retention FF 12, 13 or the data holding unit inside the retention SRAM 16. By including the power switch 18A, when there is no need for the retention FF 12, 13 and the retention SRAM 16 to hold data, the reduction effect of power consumption can be enhanced by cutting off all of the power supply voltage VDD and the power supply voltage VDDA. When the supply of the power supply voltage VDD is cut off, processed data immediately before is held in the data holding unit.

The data holding circuit controller 233 outputs the control signal RC1 or RC2 that controls data holding of a data holding circuit in the CPU 10, for example, the retention FF 12, 13 or the retention SRAM 16 to the retention FF 12, 13 or the retention SRAM 16.

The clock controller 234 outputs the control signals CC1, CC2 that control the supply or stop of the clock CK to the control target region. Further, the isolation cell controller 235 outputs the control signal RC3 that controls data output or holding by the isolation cell 19.

Hereinafter, the configuration of the power saving mode switcher 22 according to the present embodiment will be described in detail.

Figure 14:
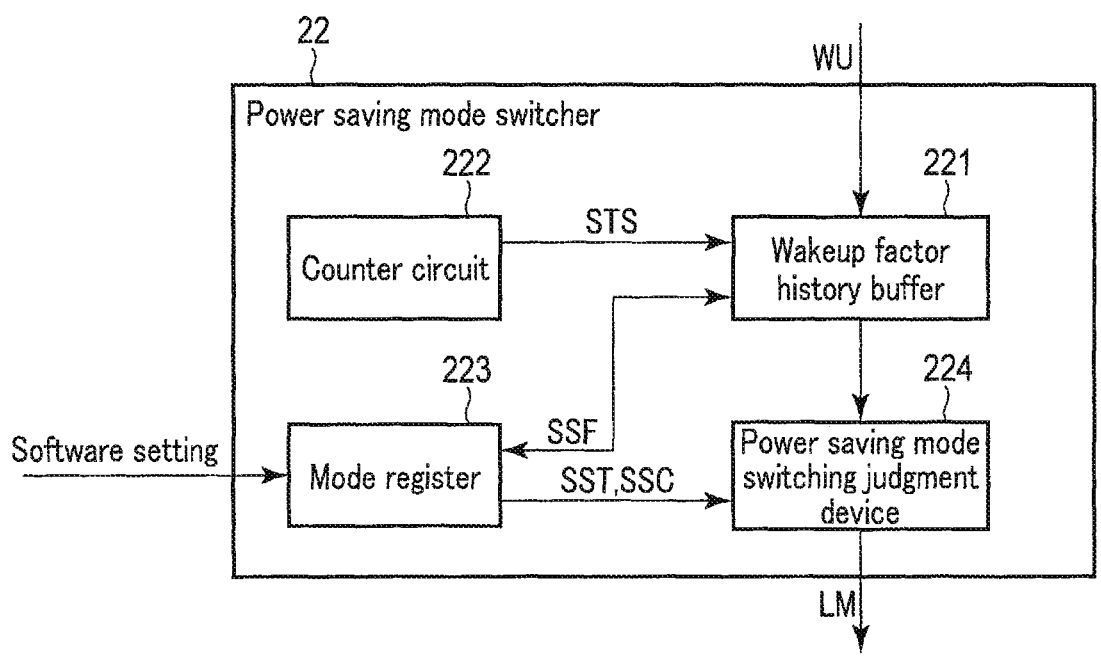
FIG. 14 is a block diagram showing the configuration of a power saving mode switcher according to the embodiment.

FIG. 14 is a block diagram showing the configuration of the power saving mode switcher 22 in the power saving controller 20 according to the embodiment.

As described above, the power saving mode switcher 22 determines which of (2) the clock gating state and (3) the retention state to use and instructs the setting of an appropriate power saving mode. The power saving mode is switched by a power saving mode switching judgment device. The power saving mode can be switched by either hardware or software and here, an example of switching by hardware is shown. In the present embodiment, a history of the wakeup factor signal WU and a switching threshold of the power saving mode are compared and the power saving mode is determined and switched in accordance with a comparison result. That is, the power saving mode switcher 22 has a plurality of power saving modes and selects an appropriate power saving mode from the plurality of power saving modes in accordance with the comparison result.

The power saving mode switcher 22 includes a wakeup factor history buffer 221, a counter circuit 222, a mode register 223, and a power saving mode switching judgment device 224. The wakeup factor history buffer 221 is not limited to a buffer and may be a FIFO (first-in first-out).

Hereinafter, details of the wakeup factor history buffer 221, the counter circuit 222, the mode register 223, and the power saving mode switching judgment device 224 will be described.

Figure 15:
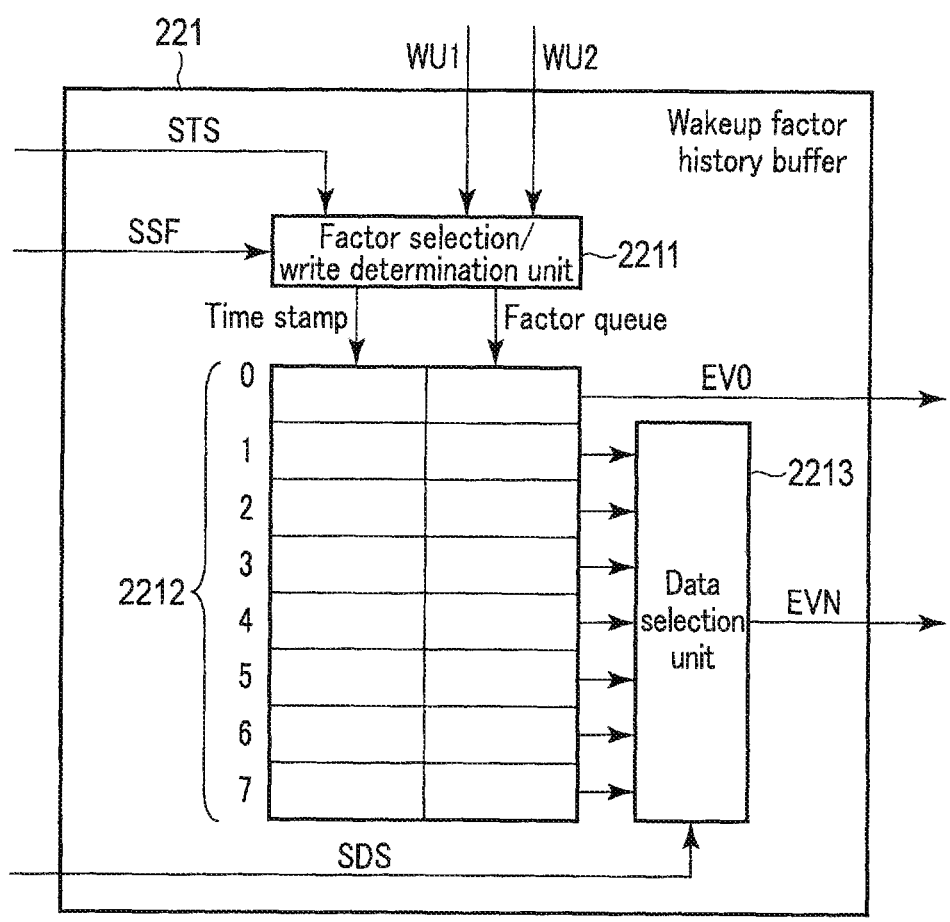
FIG. 15 is a block diagram showing the configuration of a wakeup factor history buffer according to the embodiment.

FIG. 15 is a block diagram showing the configuration of the wakeup factor history buffer 221 in the power saving mode switcher 22 according to the embodiment.

The wakeup factor history buffer 221 includes a factor selection/write determination unit 2211, a buffer 2212, and a data selector 2213.

The factor selection/write determination unit 2211 selects the wakeup factor signal WU of the type specified by a factor setting signal SSF from a plurality of types of wakeup factor signals WU1, WU2. Further, the factor selection/write determination unit 2211 stores the selected wakeup factor signal WU and the time (time stamp STS) when the wakeup factor signal is received in a memory region n (for example, n is an integer of 0 to 7) in the buffer 2212. That is, the wakeup factor signal WU and the time stamp STS of the signal are associated and stored in the buffer 2212.

The data selector 2213 selects and outputs an event (the wakeup factor signal and the time stamp) from the memory region n in the buffer 2212 specified by a selection setting signal SDS. For example, the n-th newest event EVN is selected by the data selector 2213 from the memory region n and output to the power saving mode switching judgment device 224. Also, the latest event EV0 is selected from a memory region 0 and output to the power saving mode switching judgment device 224.

The counter circuit 222 outputs the time (time stamp STS) to the wakeup factor history buffer 221.

Figure 16:
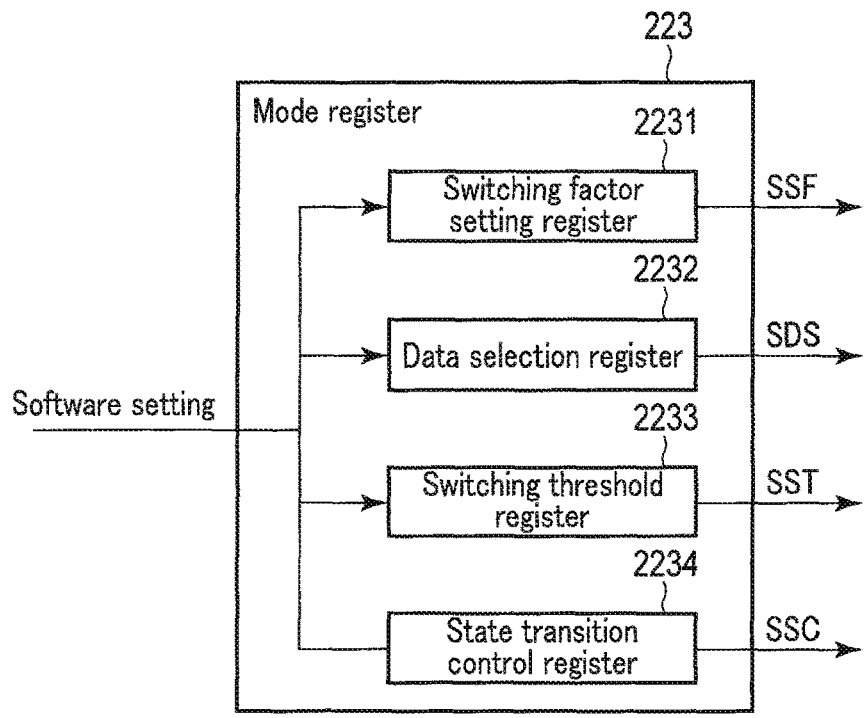
FIG. 16 is a block diagram showing the configuration of a mode register according to the embodiment.

FIG. 16 is a block diagram showing the configuration of the mode register 223 in the power saving mode switcher 22 according to the embodiment. The mode register 223 includes a switching factor setting register 2231, a data selection register 2232, a switching threshold register 2233, and a state transition control register 2234.

These registers in the mode register 223 are set by software. The switching factor setting register 2231 stores by which event, that is, by what type of wakeup factor signal to determine switching of the power saving mode. Further, the switching factor setting register 2231 outputs the factor setting signal SSF indicating the event, that is, the wakeup factor signal to the wakeup factor history buffer 221.

The data selection register 2232 stores by data of which memory region in the buffer 2212 to determine switching of the power saving mode. Further, the data selection register 2232 outputs the selection setting signal SDS indicating the memory region to the wakeup factor history buffer 221.

The switching threshold register 2233 stores the switching threshold to determine whether to switch the power saving mode. For example, the switching threshold register 2233 stores a threshold to compare with the input frequency of some type of the wakeup factor signal WU stored in the switching factor setting register 2231, more specifically, the period to compare with the input interval of the wakeup factor signal WU as a switching threshold, and outputs a threshold signal SST indicating the switching threshold to the power saving mode switching judgment device 224.

The state transition control register 2234 stores up to which state to limit the transition of the power saving state and outputs the state signal SSC that controls the state transition to the power saving mode switching judgment device 224.

Figure 17:
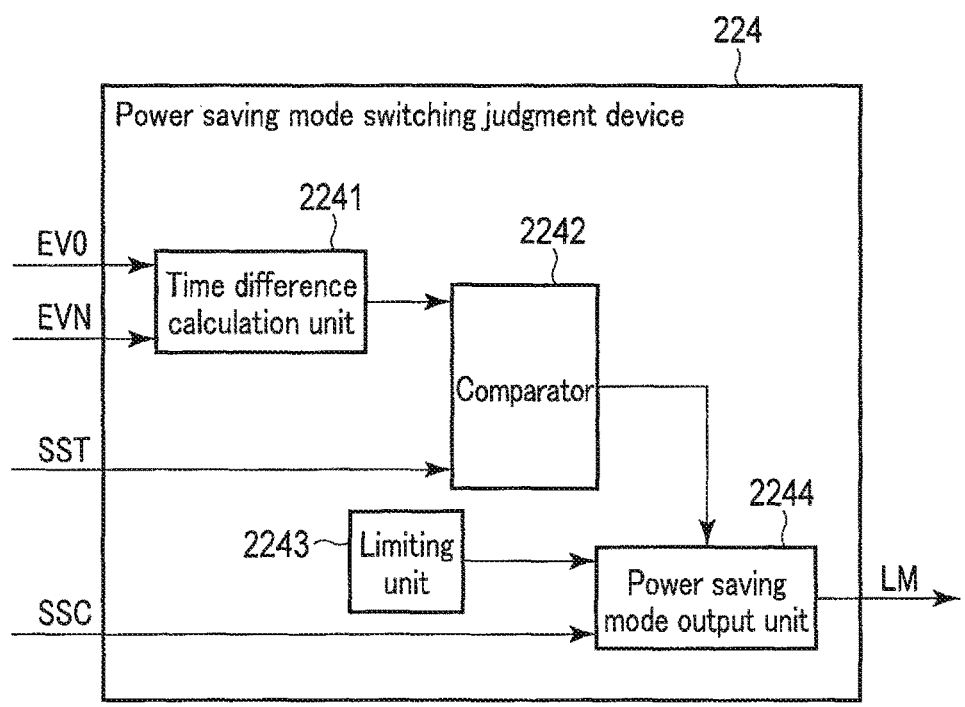
FIG. 17 is a block diagram showing the configuration of a power saving mode switching judgment device according to the embodiment.

FIG. 17 is a block diagram showing the configuration of the power saving mode switching judgment device 224 in the power saving mode switcher 22 according to the embodiment. The power saving mode switching judgment device 224 includes a time difference calculation unit 2241, a comparator 2242, a limiting unit 2243, and a power saving mode output unit 2244.

The time difference calculation unit 2241 calculates a time difference between the latest event EV0 and the n-th newest event EVN output from the buffer 2212 and the data selector 2213. The comparator 2242 compares the time difference calculated by the time difference calculation unit 2241 and the switching threshold indicated by the threshold signal SST and outputs a comparison result to the power saving mode output unit 2244.

The power saving mode output unit 2244 determines whether to switch the power saving mode based on the comparison result, a signal from the limiting unit 2243, and the state signal SSC that controls the state transition, and outputs the power saving mode signal LM to set the power saving mode.

More specifically, if the time difference calculated by the time difference calculation unit 2241 is smaller than the switching threshold indicated by the threshold signal SST, the power saving mode output unit 2244 determines that the input frequency of the selected wakeup factor signal is high. Then, the power saving mode output unit 2244 outputs the power saving mode signal LM to switch to a power saving mode appropriate for the higher input frequency to the power saving control introducer 21. On the other hand, if the time difference is larger than the switching threshold, the power saving mode output unit 2244 determines that the input frequency of the selected wakeup factor signal is low. Then, the power saving mode output unit 2244 outputs the power saving mode signal LM to switch to a power saving mode appropriate for the lower input frequency to the power saving control introducer 21.

2. Operation of Semiconductor Integrated Circuit

Four patterns (power saving control patterns 1 to 4) will be described as examples of exercising power saving control according to the present embodiment on the CPU 10. The power saving control is to control execution of clock gating by the clock gating circuit or the supply/cutoff of the power supply voltage by the power switch.

Figure 18:
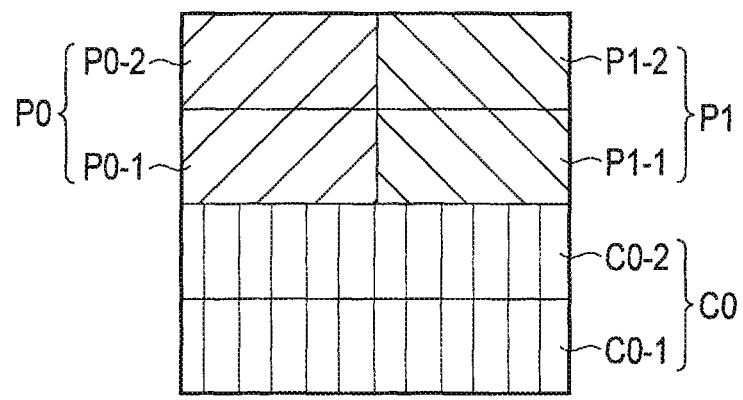
FIG. 18 is a diagram showing a control method of a power saving control pattern 1 according to the embodiment.

FIG. 18 is a diagram showing a control method of the power saving control pattern 1 according to the embodiment. In the control pattern 1, each of the cores P0, P1 and the common unit CO shown in FIG. 2 is set as the power saving control unit. That is, the power saving controller 20 handles each of the cores P0, P1 and the common unit CO as the power saving control unit and executes the power saving control of each.

Figure 19:
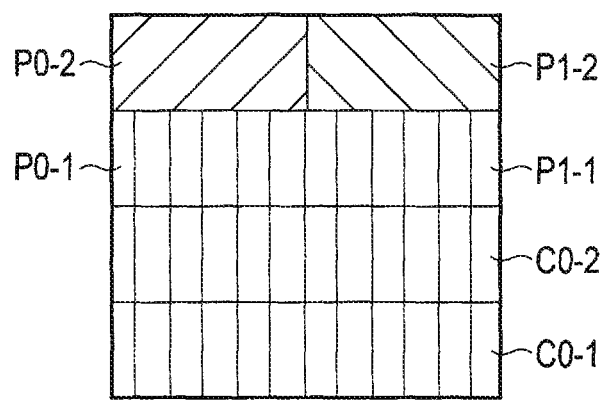
FIG. 19 is a diagram showing the control method of a power saving control pattern 2 according to the embodiment.

FIG. 19 is a diagram showing the control method of the power saving control pattern 2 according to the embodiment. The control pattern 2 is an example of reducing the power saving control range of the cores P0, P1. In the control pattern 2, the power saving control of the sub-core P0-2 of the core P0 is executed as a power saving control unit, but the sub-core P0-1 is handled as a separate power saving unit from the sub-core P0-2 without exercising individual power saving control thereof. Similarly, the power saving control of the sub-core P1-2 of the core P1 is executed as a power saving control unit, but the sub-core P1-1 is handled as a separate power saving unit from the sub-core P1-2 without exercising individual power saving control thereof. In this example, the sub-common units CO-1, CO-2, the sub-core P0-1, and the sub-core P1-1 are handled as the same power saving control unit and the power saving control thereof is executed in common.

In the control pattern 2 as described above, the power saving control of solely the sub-core P0-2 in the core P0 or the sub-core P1-2 in the core P1, that is, clock gating or the supply/cutoff of the power supply voltage can be performed solely on the sub-cores P0-2, P1-2. Thus, the time needed for power saving control can be reduced. That is, the region where clock gating is performed or the power supply is turned on or off in the core P0 or the core P1 can be reduced and thus, the time needed to cause the transition of the core P0 or the core P1 from the power saving state to the operating state can be reduced.

FIG. 20 is a diagram showing the control method of the power saving control pattern 3 according to the embodiment. In the control pattern 3, the power saving control of the core P0 (the sub-core P0-1 and the sub-core P0-2) is executed as a power saving control unit, but the core P1 is handled as a separate power saving unit from the core P0 without exercising individual power saving control thereof. In this example, the sub-common units CO-1, CO-2, the sub-core P1-1, and the sub-core P1-2 are handled as the same power saving control unit and the power saving control thereof is executed in common.

The control pattern 3 as described above is very effective if used when the core P0 is not operated frequently, but the core P1 is operated frequently. In this case, the power saving control of solely the core P0 can be executed, that is, clocking gating or the supply/cutoff of the power supply voltage can be performed solely on the core P0. Thus, the time needed for power saving control can be reduced. That is, the time needed for the release of clock gating or the supply/cutoff of the power supply voltage can be reduced. On the other hand, the time needed to cause the transition of the core P1 from the power saving state to the operating state can be reduced by exercising the same power saving control as the common unit CO without exercising individual power saving control of the core P1 operated frequently.

FIG. 21 is a diagram showing the control method of the power saving control pattern 4 according to the embodiment. The control pattern 4 is an example of reducing the power saving control range of the common unit CO. In the control pattern 4, the power saving control of each of the core P0 and the core P1 is executed as the power saving control unit. The power saving control of the sub-common unit CO-2 of the common unit CO is also executed. On the other hand, the sub-common unit CO-1 is not handled as a power saving control unit and the power saving control thereof is not executed.

The control pattern 4 as described above is used when the time needed for power saving control of the common unit CO should be reduced. In this case, the time needed for the operation of the common unit CO can be reduced by exercising the power saving control of the sub-common unit CO-2, but not the sub-common unit CO-1.

Figure 22:
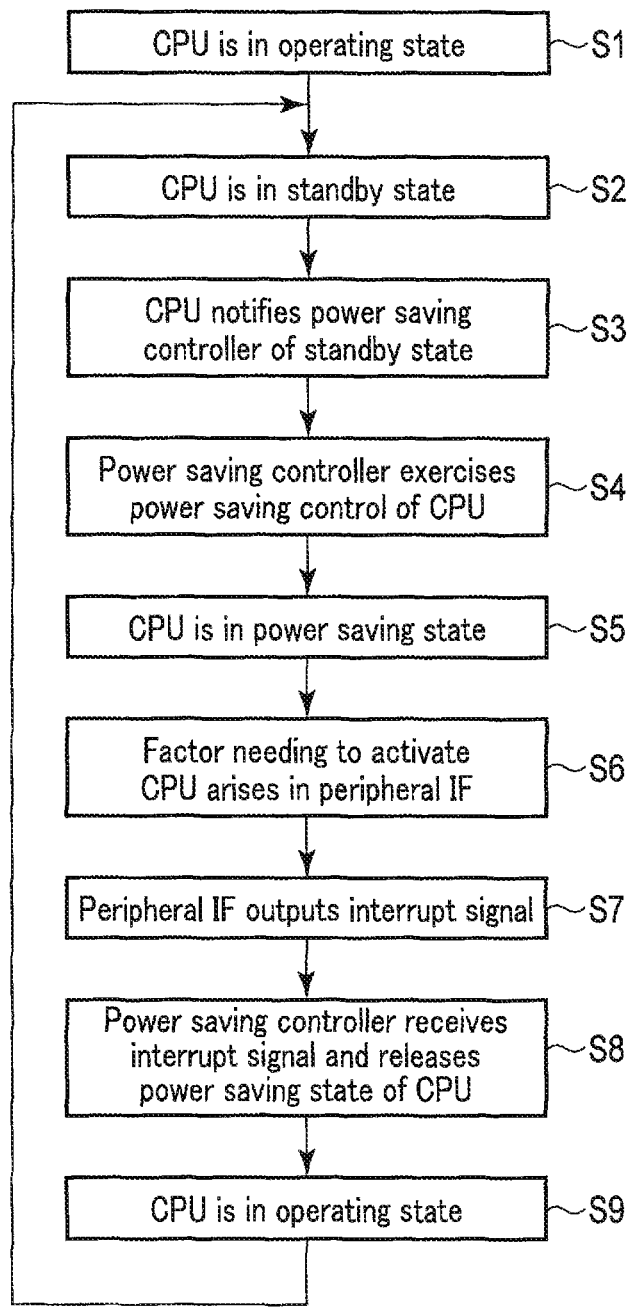
FIG. 22 is a flow chart showing an operation of the semiconductor integrated circuit according to the embodiment.

Next, an overview of the operation of a semiconductor integrated circuit will be provided with reference to FIGS. 1 and 22.

FIG. 22 is a flow chart showing the operation of the semiconductor integrated circuit according to the embodiment.

First, it is assumed that the control target region in the CPU 10 is in an operating state (step S1). Then, the processing in the CPU 10 terminates and the control target region in the CPU 10 changes to a standby state (step S2). When the control target region in the CPU 10 is changed to a standby state, the power saving controller 20 is notified that the control target region is in a standby state. That is, the CPU 10 notifies the power saving controller 20 of the sleep factor signal SP (step S3).

Next, the power saving controller 20 executes the power saving control of the CPU 10 (step S4). That is, in the current power saving mode, the power saving controller 20 executes the power saving control of the control target region in the CPU 10 in accordance with the received sleep factor signal. Accordingly, the control target region in the CPU 10 is put into a power saving state (step S5).

Subsequently, a factor that needs an operation of the CPU 10 is input into the peripheral interface 40 (step S6). Then, the peripheral interface 40 outputs the wakeup factor signal (interrupt signal) WU to the power saving controller 20 (step S7).

When the wakeup factor signal WU is received, the power saving controller 20 releases the power saving state of the control target region in the CPU 10 (step S8). Accordingly, the control target region in the CPU 10 is put into an operating state again (step S9). Subsequently, the processing of the CPU 10 terminates and then returning to step S2. Here, the processing of power-off is not described, but the processing of power-off is provided when necessary.

Next, the operation of the power saving controller 20 will be described with reference to FIGS. 11 and 23.

Figure 23:
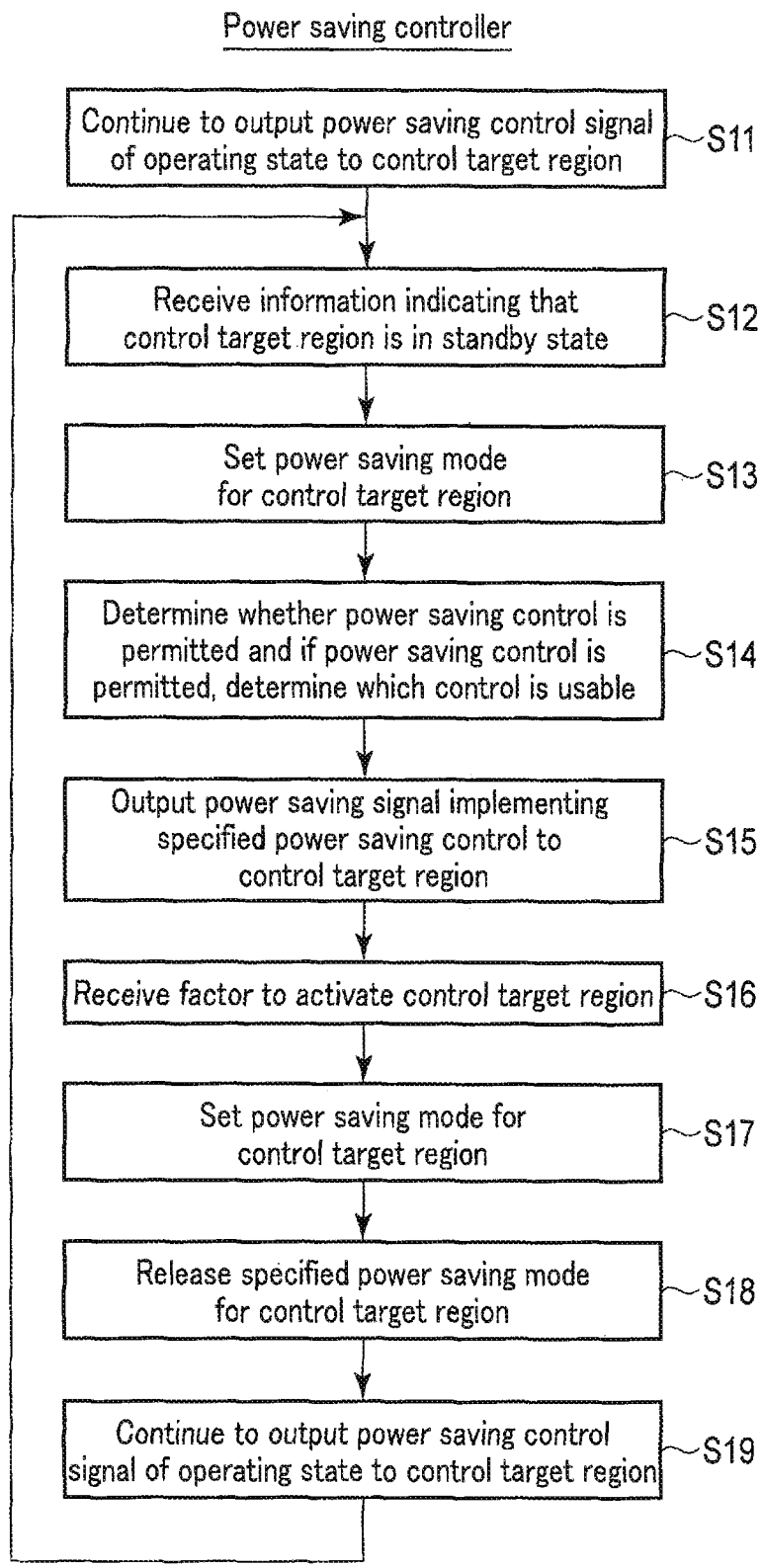
FIG. 23 is a flow chart showing the operation of the power saving controller according to the embodiment.

FIG. 23 is a flow chart showing the operation of the power saving controller 20 according to the embodiment.

First, the power saving control sequencer 23 outputs the power saving control signal LC instructing an operating state to the control target region (the sub-cores P0-1, P0-2, P1-1, P1-2 and the sub-common units CO-1, CO-2) in the CPU 10 (step S11). Subsequently, the power saving control introducer 21 receives information indicating that the control target region in the CPU 10 is in a standby state. The power saving control introducer 21 receives a sleep signal indicating that the control target region is in a standby state from the CPU 10 (step S12).

Next, the power saving mode switcher 22 sets the power saving mode for the control target region (step S13). The setting of the power saving mode will be described later.

Subsequently, the power saving mode switcher 22 determines whether the power saving control is permitted for the control target region in the CPU 10. If the power saving control is permitted, the power saving mode switcher 22 determines which control can be applied (step S14). If the power saving control is not permitted, the power saving mode switcher 22 terminates the processing.

Next, the power saving control sequencer 23 outputs the power saving control signal LC that implements the specified power saving control for the control target region (step S15).

Then, if a factor (wakeup factor signal WU) to operate the control target region is received (step S16), the power saving mode switcher 22 sets the power saving mode for the control target region again. That is, the power saving mode switcher 22 sets the power saving mode for the control target region each time the wakeup factor signal WU is received (step S17).

Next, the power saving control sequencer 23 releases the power saving mode specified for the control target region. That is, the power saving control sequencer 23 outputs the power saving control signal LC that instructs the transition from the power saving state to the operating state for the control target region (step S18).

Subsequently, the power saving control sequencer 23 outputs the power saving control signal LC instructing an operating state for the control target region in the CPU 10 (step S19). Subsequently, the processing in the CPU 10 terminates and then returning to step S12.

Next, the operation of the power saving mode switcher 22 will be described with reference to FIGS. 14 and 24.

FIG. 24 is a flow chart showing the operation of the power saving mode switcher 22 according to the embodiment.

In the present embodiment, the power saving mode is switched by the power saving mode switcher 22 based on a history of the wakeup factor signal WU (or the sleep factor signal SP). That is, each time the wakeup factor signal WU (or the sleep factor signal SP) is input, the power saving mode switcher 22 sets the power saving mode depending on whether the input frequency of the wakeup factor signal WU (or the sleep factor signal SP) is larger than the switching threshold.

First, a pointer N of data in the history buffer 221 used for switching determination is set to the data selection register 2232 in the mode register 223. Further, the switching threshold (time) of the power saving mode is set to the switching threshold register 2233 in the mode register 223 (step S21).

Next, the initial value of the power saving mode for the control target region in the CPU 10 is set (step S22). The power saving mode switching judgment device 224 outputs the power saving mode signal LM indicating the set power saving mode (step S23).

When a factor signal (wakeup factor signal WU) to operate the control target region is received (step S24), the history buffer 221 stores the wakeup factor signal WU to be a factor to switch the power saving mode and the time stamp STS at that time in the latest line (pointer 0) of the history buffer 221 (step S25). The pointer 0 to 7 indicating the memory region n in the history buffer 221 is incremented each time information is stored in the memory region n.

Next, the latest event EV0 is selected from the memory region 0 in the history buffer 221 and the n-th newest event EVN is selected from the memory region n and both events are output to the power saving mode switching judgment device 224 (step S26). The time difference calculation unit 2241 in the power saving mode switching judgment device 224 calculates a time difference of time stamps from the event EV0 and the event EVN (step S27).

Subsequently, the comparator 2242 compares the switching threshold stored in the switching threshold register 2233 in the mode register 223 and the time difference of the time stamps and outputs a comparison result. The power saving mode output unit 2244 sets the power saving mode based on the comparison result and a signal output from the limiting unit 2243 (step S28). Then, the power saving mode output unit 2244 outputs the set power saving mode signal LM (step S29). The power saving mode signal LM is a signal instructing switching of the power saving mode or a signal instructing maintenance of the current power saving mode. Then, returning to step S24 to wait until a factor signal (wakeup factor signal WU) to operate the control target region is received.

3. Effects and the Like

In the present embodiment, the core and the common unit including a cache memory and the like other than the core included in the CPU 10 are divided by function unit, or area or power saving processing time unrelated to function into a plurality of regions and power saving control; that is, clock gating or the supply/cutoff of the power supply voltage is performed on each divided region (control target region) or a combined region. Accordingly, a wide range of control from control focusing on power saving to control focusing on throughput can be executed for the control target region in the CPU 10.

Also in the present embodiment, the counter circuit 222 is arranged in the power saving mode switcher 22 and the time (time stamp STS) can be acquired from the counter circuit 222. When the wakeup factor signal WU is input, the time stamp STS acquired from the counter circuit 222 is recorded in the wakeup factor history buffer 221 together with the wakeup factor signal WU. Accordingly, a history of the wakeup factor signal WU of how frequently the wakeup factor signal WU is input can be recorded.

Switching of the power saving mode is determined by comparing the input frequency of the wakeup factor signal WU and the switching threshold SST of the power saving mode. The switching threshold serves as a criterion for determining to which power saving mode to switch, that is, which power saving mode to set. The switching threshold SST is set to the switching threshold register 2233 in the mode register 223. Also, the switching factor setting register 2231 is mounted to select the factor signal to be used as a determination factor when there are a plurality of wakeup factor signals.

Hereinafter, the switching determination of the power saving mode will be described.

The state in which "input frequency of the wakeup factor signal>switching threshold" applies is a state in which the wakeup factor signal arises frequently. In the present embodiment, as a means of determining the input frequency of the wakeup factor signal, whether the input frequency of the wakeup factor signal is high or low is determined by calculating a time difference between the n-th newest wakeup factor signal and the latest wakeup factor signal and comparing the time difference with the switching threshold. Thus, the case of "input frequency of the wakeup factor signal>switching threshold" is a case of "time difference of the wakeup factor signal<switching threshold". In this case, a power saving mode that selects a power saving state (first power saving state) like (2) clock gating in which it does not take time to return to an operating state is set. Accordingly, the deterioration of throughput of the CPU 10 can be avoided.

On the other hand, the state in which "input frequency of the wakeup factor signal<switching threshold" applies is a state in which the wakeup factor signal does not arise frequently. The case of "input frequency of the wakeup factor signal<switching threshold" is a case of "time difference of the wakeup factor signal>switching threshold". In this case, a power saving mode that selects a power saving state (second power saving state) like (3), a retention state, in which a high level of reduction effect of power consumption is obtained by cutting off the supply of the power supply voltage, is set. In other words, the power saving controller 20 causes the control target region to transition to the second power saving state in which the reduction amount of power consumption is larger than the first power saving state, but the transition time from a power saving state to an operating state is longer.

Also, a control method of stopping the supply of clock to a region of, for example, the first ratio (for example, 30%) of the control target region in the first power saving state and stopping the supply of clock to a region of the second ratio (for example, 70%) of the control target region in the second power saving state may be adopted. Also, a control method of cutting off the supply of power supply voltage to a region of the first ratio (for example, 30%) of the control target region in the first power saving state and cutting off the supply of power supply voltage to a region of the second ratio (for example, 70%) of the control target region in the second power saving state may be adopted. Further, a method of cutting off the supply of power supply voltage to a region of 100% of the control target region in the first power saving state and cutting off the supply of power supply voltage to a region of 100% of the control target region and also cutting off the power supply of a data holding unit in the second power saving state may be adopted.

Here, the first ratio is set to 30% and the second ratio is set to 70%, but other ratios may also be adopted as long as the second ratio is larger than the first ratio. Also in the first power saving state and the second power saving state, control may be executed such that the reduction amount of power consumption is larger in the second power saving state than in the first power saving state by performing both of the supply stop of clock and supply cutoff of the power supply voltage.

In the present embodiment, a plurality of power saving modes can be defined and by automatic switching of these power saving modes using hardware, an effect of lower power consumption and improved system performance can be combined and also software control can easily be executed so that improved maintenance of software can also be gained. Accordingly, the introduction cost of software for lower power consumption can be reduced.

According to the embodiments, as described above, the semiconductor integrated circuit capable of combining lower power consumption and improved system performance can be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
an arithmetic processing circuit including a first processor core performing arithmetic processing and a common unit containing a cache memory storing data and programs, at least one of the first processor core and the common unit being divided into a first circuit and a second circuit;
a first clock gating circuit that supplies or stops a clock signal to the first circuit;
a first power switch that supplies or cuts off a power supply voltage to the first circuit;
a second clock gating circuit that supplies or stops the clock signal to the second circuit;
a second power switch that supplies or cuts off the power supply voltage to the second circuit; and
a controller that controls the first and second clock gating circuits and the first and second power switches,
wherein the controller includes a plurality of power saving modes that control at least one of the first circuit, the second circuit, the first processor core and the common unit to a power saving state, and
the controller selects the power saving mode for at least one of the first circuit, the second circuit, the first processor core and the common unit from the plurality of power saving modes based on an input frequency of a wakeup signal to be a factor to activate at least one of the above to an operating state.

2. The semiconductor integrated circuit according to claim 1,
wherein the plurality of power saving modes includes a first power saving mode and a second power saving mode,
when the input frequency of the wakeup signal is equal to or higher than a threshold, the controller selects the first power saving mode in which a return time to the operating state is shorter than that in the second power saving mode, and when the input frequency of the wakeup signal is smaller than the threshold, the controller selects the second power saving mode in which a reduction amount of power consumption is larger than that in the first power saving mode.

3. The semiconductor integrated circuit according to claim 1, further comprising at least one set of a third clock gating circuit and a third power switch, and a fourth clock gating circuit and a fourth power switch, wherein the third clock gating circuit supplies or stops the clock signal to the common unit, the third power switch supplies or cuts off the power supply voltage to the common unit, the fourth clock gating circuit supplies or stops the clock signal to the first processor core, and the fourth power switch supplies or cuts off the power supply voltage to the first processor core,
wherein the controller controls at least the one set of the third clock gating circuit and the third power switch, and the fourth clock gating circuit and the fourth power switch.

4. The semiconductor integrated circuit according to claim 1,
wherein at least one of the first circuit, the second circuit, the first processor core, and the common unit has a data holding unit that holds processed data immediately before when a supply of the power supply voltage is cut off.

5. The semiconductor integrated circuit according to claim 1,
wherein the first circuit has a first function unit and the second circuit has a second function unit different from the first function unit.

6. The semiconductor integrated circuit according to claim 5,
wherein when the first processor core includes the first circuit and the second circuit, at least one of the first function unit and the second function unit includes at least one of an arithmetic processing unit, an instruction processing unit, a data processing unit, and a memory system.

7. The semiconductor integrated circuit according to claim 5,
wherein when the common unit includes the first circuit and the second circuit, at least one of the first function unit and the second function unit includes at least one of a cache memory and a memory controller that controls the cache memory.

8. The semiconductor integrated circuit according to claim 1,
wherein the first circuit and the second circuit are divided by an area or shape unrelated to a function unit.

9. The semiconductor integrated circuit according to claim 1,
wherein the controller includes a buffer that stores the wakeup signal and an input time of the wakeup signal,
the controller calculates a time difference between the input time of the wakeup signal input most recently and the input time of the wakeup signal n (n is an integer equal to 1 or greater) signals before, and
the controller compares the time difference and a switching threshold to select the power saving mode for at least one of the above in accordance with a comparison result.

10. The semiconductor integrated circuit according to claim 9,
wherein the power saving state controlled by the controller has a first power saving state and a second power saving state in which a reduction amount of power consumption is larger than in the first power saving state,
when the time difference is smaller than the switching threshold, the controller causes a transition of at least one of the first circuit, the second circuit, the first processor core and the common unit to the first power saving state, and
when the time difference is equal to or larger than the switching threshold, the controller causes the transition of at least one of the first circuit, the second circuit, the first processor core and the common unit to the second power saving state.

11. The semiconductor integrated circuit according to claim 10,
wherein the first power saving state includes stopping a supply of the clock signal to at least one of the first circuit, the second circuit, the first processor core and the common unit, and
the second power saving state includes cutting off the supply of the power supply voltage to at least one of the above.

12. The semiconductor integrated circuit according to claim 10,
wherein the first power saving state stops the supply of the clock signal to a region of a first ratio of at least one region of the first circuit, the second circuit, the first processor core and the common unit, and
the second power saving state stops the supply of the clock signal to a region of a second ratio larger than the first ratio of at least the one region.

13. The semiconductor integrated circuit according to claim 10, wherein the first power saving state cuts off the supply of the power supply voltage to a region of a first ratio of at least one region of the first circuit, the second circuit, the first processor core and the common unit, and the second power saving state cuts off the supply of the power supply voltage to a region of a second ratio larger than the first ratio of at least the one region.

14. The semiconductor integrated circuit according to claim 1, wherein the arithmetic processing circuit further includes a second processor core performing the arithmetic processing, the second processor core is divided into a third circuit and a fourth circuit, and the first and second processor cores share the cache memory included in the common unit, further comprising:

a fifth clock gating circuit that supplies or stops the clock signal to the third circuit;

a fifth power switch that supplies or cuts off the power supply voltage to the third circuit;

a sixth clock gating circuit that supplies or stops the clock signal to the fourth circuit; and a sixth power switch that supplies or cuts off the power supply voltage to the fourth circuit, wherein the controller controls the fifth and sixth clock gating circuits and the fifth and sixth power switches.

15. The semiconductor integrated circuit according to claim 3, further comprising a seventh power switch that supplies or cuts off the power supply voltage to the data holding unit.

* * * * *